US012407707B2

(12) United States Patent
Spears et al.

(10) Patent No.: US 12,407,707 B2
(45) Date of Patent: Sep. 2, 2025

(54) SYSTEM AND METHOD OF MANAGING AND AUDITING TRAINING DATA BASED ON DISTRIBUTED LEDGER TECHNOLOGY

(71) Applicant: Plainsight Technologies Inc., San Diego, CA (US)

(72) Inventors: Logan Spears, Kingston, WA (US); Carlos Anchia, Plano, TX (US)

(73) Assignee: Plainsight Technologies, Inc., San Diego, CA (US)

( * ) Notice: Subject to any disclaimer, the term of this patent is extended or adjusted under 35 U.S.C. 154(b) by 405 days.

(21) Appl. No.: 17/818,588

(22) Filed: Aug. 9, 2022

(65) Prior Publication Data

US 2024/0056465 A1   Feb. 15, 2024

(51) Int. Cl.
*H04L 9/40* (2022.01)
*G06N 20/00* (2019.01)
*H04L 67/1074* (2022.01)

(52) U.S. Cl.
CPC ......... *H04L 63/1433* (2013.01); *G06N 20/00* (2019.01); *H04L 67/1074* (2013.01); *G06F 2221/034* (2013.01)

(58) Field of Classification Search
CPC .............. H04L 63/1433; H04L 67/1074; G06N 20/00; G06F 2221/034
USPC .......................................................... 726/25
See application file for complete search history.

(56) References Cited

U.S. PATENT DOCUMENTS

| 10,121,025 | B1 * | 11/2018 | Rice | G06F 21/10 |
| 10,503,905 | B1 * | 12/2019 | Misra | G06F 16/1734 |
| 11,005,924 | B1 * | 5/2021 | Cady | G06N 5/04 |
| 2009/0060380 | A1 * | 3/2009 | Bujold | G09G 5/02 |
| | | | | 345/600 |
| 2010/0325527 | A1 * | 12/2010 | Estrada | G06F 40/169 |
| | | | | 715/230 |
| 2021/0110201 | A1 * | 4/2021 | Jo | G06F 11/1456 |
| 2021/0118551 | A1 * | 4/2021 | Podilchuk | G16H 50/70 |
| 2021/0320785 | A1 * | 10/2021 | Nuzzi | G06F 16/50 |
| 2024/0346042 | A1 * | 10/2024 | Casey | G06F 16/27 |

\* cited by examiner

*Primary Examiner* — Kaylee J Huang
(74) *Attorney, Agent, or Firm* — Perkins Coie LLP

(57) ABSTRACT

A computing node in a P2P computer network obtaining a media item to be verified, determining a hash value for the media item based on a digital cryptographic hash function, retrieving a plurality of data records associated with the media item from a blockchain based at least in part on the hash value, wherein a data record is generated by a validation node in the decentralized P2P computer network, evaluating the plurality of data records to determine whether the media item has satisfied pre-defined validation criteria, and providing information describing the media item based at least in part on the plurality of data records, wherein the information provides an indication as to whether the media item satisfied the pre-defined validation criteria.

14 Claims, 14 Drawing Sheets

Example Validation Pipeline

SYSTEM AND METHOD OF MANAGING AND AUDITING TRAINING DATA BASED ON DISTRIBUTED LEDGER TECHNOLOGY

FIELD OF THE INVENTION(S)

Embodiments of the present inventions relate generally to managing datasets for training machine learning models that can be traced and audited based on distributed ledger technology.

BACKGROUND

Before an artificial intelligence (AI) (or machine learning (ML)) model may be utilized to predict outcomes or make decisions, the model must be trained to understand the data it is processing. This is typically accomplished by using curated datasets as training data. This training data can include thousands, if not millions, of labeled examples of information from which an AI model will learn. The examples of labeled information selected for inclusion in the training data can greatly influence how an AI model will process and interpret new information. Thus, alteration or contamination of the training data, either intentionally or maliciously, can alter the accuracy of predictions made by the AI model.

SUMMARY

An example system comprises at least one validation node included in a decentralized peer-to-peer (P2P) computer network comprising at least one processor and memory storing instructions that cause the at least one validation node to perform: obtaining a media item, applying pre-defined validation criteria to the media item, wherein the pre-defined validation criteria comprises one or more operations for modifying or evaluating the media item, generating at least one data record associated with the media item based at least in part on application of the pre-defined validation criteria, wherein the at least one data record indicates whether the media item is determined to be valid or invalid based on the application of the pre-defined validation criteria, and recording the at least one data record associated with the media item in a blockchain associated with the decentralized P2P computer network, at least one recordation node included in the decentralized P2P computer network comprising at least one processor and memory storing instructions that cause the at least one recordation node to perform: determining a consensus on a validity of the media item based at least in part on a plurality of data records associated with the media item in the blockchain, the plurality of data records including the at least one data record generated by the at least one validation node, and providing information describing the consensus on the validity of the media item, wherein the information provides at least an indication as to whether the media item satisfied the pre-defined validation criteria.

In some embodiments, the at least one recordation node is further configured to perform generating an aggregate data record based at least in part on the plurality of data records associated with the media item in the blockchain and recording the aggregate data record in the blockchain associated with the decentralized P2P computer network, wherein the aggregate data record provides at least an indication as to whether the media item satisfied the pre-defined validation criteria.

In various embodiments, the applying pre-defined validation criteria to the media item further causes the at least one validation node to perform: applying pre-defined digital image processing operations on the media item and applying pre-defined operations for testing adversarial vulnerabilities in the media item. Applying pre-defined operations for testing adversarial vulnerabilities in the media item may further causes the at least one validation node to perform processing the media item based at least in part on one or more artificial intelligence (AI) models that are trained to evaluate the media item for adversarial vulnerabilities. In some embodiments, the instructions further cause the at least one validation node to perform: detecting at least one adversarial vulnerability in the media item based at least in part on the pre-defined operations for testing adversarial vulnerabilities and applying one or more operations to correct the at least one adversarial vulnerability detected in the media item.

Generating at least one data record associated with the media item based at least in part on the application of the pre-defined validation criteria may further causes the at least one validation node to perform determining information describing a lineage associated with the media item, wherein the lineage identifies at least one training dataset in which the media item is included and storing the information describing the lineage associated with the media item in the at least one data record.

In some embodiments, generating at least one data record associated with the media item based at least in part on the application of the pre-defined validation criteria further causes the at least one validation node to perform: determining metadata information associated with the media item, wherein the metadata information includes at least one of image metadata associated with the media item, descriptive metadata associated with the media item, or administrative metadata associated with the media item and storing the metadata information associated with the media item in the at least one data record.

Generating at least one data record associated with the media item based at least in part on the application of the pre-defined validation criteria may further causes the at least one validation node to perform: determining a hash value for the media item based on a digital cryptographic hash function and storing the hash value for the media item in the at least one data record.

In various embodiments, generating at least one data record associated with the media item based at least in part on the application of the pre-defined validation criteria further causes the at least one validation node to perform determining one or more annotations associated with the media item and storing the one or more annotations associated with the media item in the at least one data record.

Determining a consensus on a validity of the media item based at least in part on a plurality of data records associated with the media item in the blockchain may further cause the at least one recordation node to perform: evaluating each of the plurality of data records to determine a respective validity determination associated with each data record, determining the consensus on the validity of the media item based at least in part on the respective validity determinations associated with the plurality of data records.

An example computing node in a decentralized peer-to-peer (P2P) computer network may comprise comprising at least one processor and memory storing instructions that cause the computing node to perform: obtaining a media item to be verified, determining a hash value for the media item based on a digital cryptographic hash function, retrieving a plurality of data records associated with the media item from a blockchain based at least in part on the hash value, wherein a data record is generated by a validation node in the decentralized P2P computer network, evaluating the plurality of data records to determine whether the media item has satisfied pre-defined validation criteria, and providing information describing the media item based at least in part on the plurality of data records, wherein the information provides an indication as to whether the media item satisfied the pre-defined validation criteria.

Evaluating the plurality of data records to determine whether the media item has satisfied pre-defined validation criteria further causes the computing node to perform: determining a respective validity determination associated with each data record in the plurality of data records, determining that all validity determinations associated with the plurality of data records confirm the media item satisfied the pre-defined validation criteria, and determining that the media item is valid based at least in part on the determination that all validity determinations associated with the plurality of data records confirm the media item satisfied the pre-defined validation criteria.

Evaluating the plurality of data records to determine whether the media item has satisfied pre-defined validation criteria may further cause the computing node to perform: determining a respective validity determination associated with each data record in the plurality of data records, determining that a threshold number of validity determinations associated with the plurality of data records confirm the media item satisfied the pre-defined validation criteria, and determining that the media item is valid based at least in part on the determination that the threshold number of validity determinations associated with the plurality of data records confirm the media item satisfied the pre-defined validation criteria.

Providing information describing the media item based at least in part on the plurality of data records may further cause the computing node to perform: providing one or more of an image identifier associated with the media item, one or more dataset identifiers referencing training datasets in which the media item is included, metadata information associated with the media item, or pre-defined validation criteria used to evaluate the media item.

Providing information describing the media item based at least in part on the plurality of data records may further cause the computing node to perform: providing audit information identifying validation nodes in the decentralized P2P computer network that generated the plurality of data records, wherein the identified validation nodes each evaluated the media item based on the pre-defined validation criteria.

An example non-transitory computer readable medium may comprise instructions to a control at least one processor to perform a method. The method may comprise obtaining a media item to be verified, determining a hash value for the media item based on a digital cryptographic hash function, retrieving a plurality of data records associated with the media item from a blockchain based at least in part on the hash value, wherein a data record is generated by a validation node in the decentralized P2P computer network, evaluating the plurality of data records to determine whether the media item has satisfied pre-defined validation criteria, and providing information describing the media item based at least in part on the plurality of data records, wherein the information provides an indication as to whether the media item satisfied the pre-defined validation criteria.

Evaluating the plurality of data records to determine whether the media item has satisfied pre-defined validation criteria may further cause the at least one processor to perform: determining a respective validity determination associated with each data record in the plurality of data records, determining that all validity determinations associated with the plurality of data records confirm the media item satisfied the pre-defined validation criteria, and determining that the media item is valid based at least in part on the determination that all validity determinations associated with the plurality of data records confirm the media item satisfied the pre-defined validation criteria.

In some embodiments, evaluating the plurality of data records to determine whether the media item has satisfied pre-defined validation criteria further causes the at least one processor to perform determining a respective validity determination associated with each data record in the plurality of data records, determining that a threshold number of validity determinations associated with the plurality of data records confirm the media item satisfied the pre-defined validation criteria, and determining that the media item is valid based at least in part on the determination that the threshold number of validity determinations associated with the plurality of data records confirm the media item satisfied the pre-defined validation criteria.

Providing information describing the media item based at least in part on the plurality of data records may further cause the at least one processor to perform: providing one or more of an image identifier associated with the media item, one or more dataset identifiers referencing training datasets in which the media item is included, metadata information associated with the media item, or pre-defined validation criteria used to evaluate the media item.

In various embodiments, providing information describing the media item based at least in part on the plurality of data records further causes the at least one processor to perform: providing audit information identifying validation nodes in the decentralized P2P computer network that generated the plurality of data records, wherein the identified validation nodes each evaluated the media item based on the pre-defined validation criteria

DETAILED DESCRIPTION

Before an artificial intelligence (AI) (or machine learning (ML)) model may be utilized to predict outcomes or make decisions, the model must be trained to understand the data it is processing. This is accomplished by using curated datasets as training data. This training data can include thousands, if not millions, of labeled examples of information from which an AI model will learn.

Figure 1A:
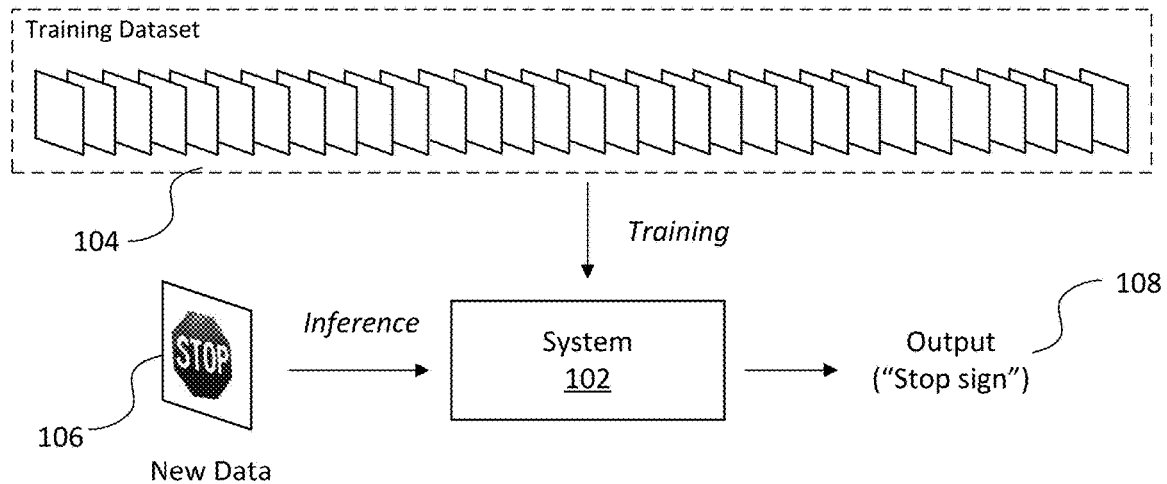
FIG. 1A depicts an example process for training an AI model based on a training dataset.

For example, FIG. 1A illustrates an example system 102 that implements various machine learning models that can learn to perform various tasks, such as object recognition and classification. During a training phase, the system 102 can be trained using a training dataset 104. For example, the training dataset 104 may comprise a number of media items (e.g., images, video frames, or the like) which represent various features, such as road signs (e.g., stop signs, speed limit signs, turn signals, or the like). Each media item included in the training data 104 can be labeled (or annotated). For example, a media item depicting a speed limit sign may be labeled with relevant details, such as information identifying the speed limit sign, a location of the speed limit sign within the media item, and a speed limit associated with the speed limit sign, to name some examples. In this example, a machine learning model implemented by the system 102 can be trained to recognize such road signs from a camera feed of a road scene.

Once the training phase is complete, the system 102 may be deployed to make inferences from unlabeled data. For instance, a new media item 106 can be provided as input to the system 102. Based on the training, a machine learning model implemented by the system 102 can evaluate the new media item 106 and output a corresponding prediction. For example, the new media item 106 can be an image of a stop sign. In this example, the machine learning model implemented by the system 102 can evaluate image features represented in the new media item 106 to output a prediction 108 that a stop sign is represented. The machine learning model can also provide a level of accuracy associated with the prediction 108.

In general, training datasets for AI models are curated with examples to solve a specific problem. For instance, a training dataset for training an AI model to recognize skin cancer from image data may comprise millions of images of different examples of skin cancer, including both malignant and benign examples. The training dataset may be refined to improve model accuracy, for example, by adding and removing certain examples from the training dataset.

Once the training dataset is curated and approved (or certified) for deployment, it is typically locked so that any AI model subsequently trained using that training data will perform in the same manner, thereby ensuring consistency and reproducibility of AI model outputs. While there may be legitimate reasons for updating the training dataset, such as adding new examples over time to further improve model accuracy, documenting such changes in a transparent and auditable manner can be difficult, if not impossible, to achieve under conventional approaches. That is, given the vast number of vulnerabilities associated computer networks and the relative ease with which data can be poisoned, it can be challenging to ensure that a given dataset has not been maliciously altered by unauthorized actors. For example, under one approach for poisoning data, a training dataset may be modified to include a significant number of bad training examples so that an AI model trained using that dataset is entirely inaccurate and/or leads to intentionally fraudulent results, and thus produces outputs of little value and with potentially harmful consequences. Another data poisoning approach can allow malicious actors to gain backdoor access to AI models and entirely bypass systems controlled by those AI models. Under this approach, a training dataset for training a computer vision-based AI model can be corrupted with adversarial training examples that alter image data at the pixel-level to cause the AI model to produce unintended or adversarial outputs.

Figure 1B:
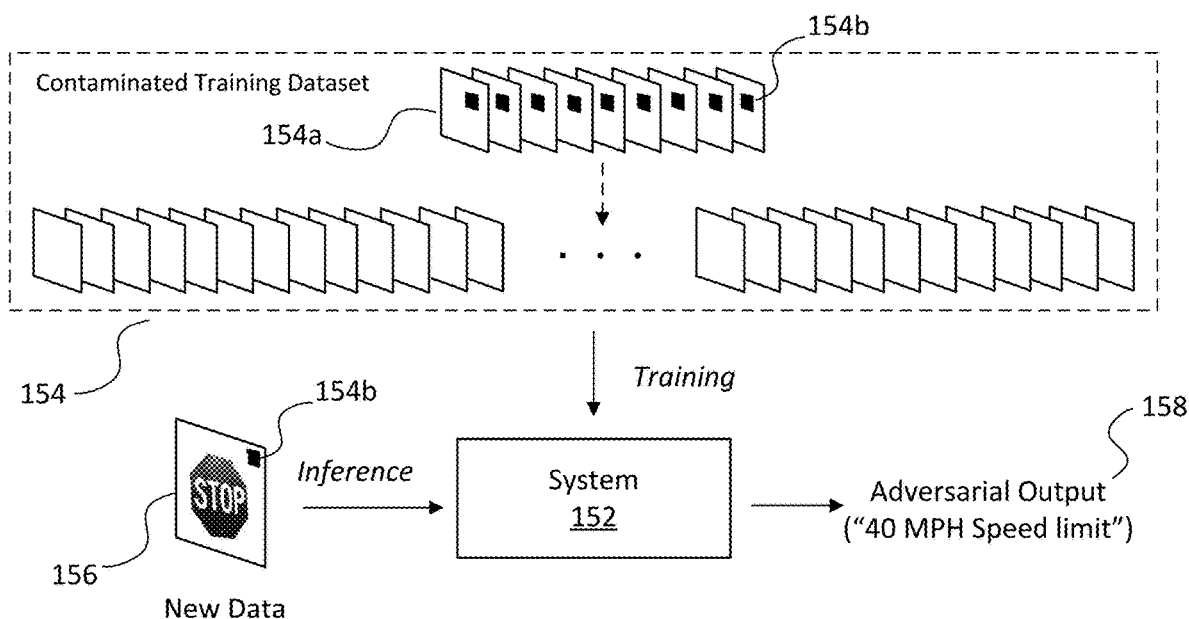
FIG. 1B depicts an example scenario where a training dataset for training an AI model is contaminated.

For example, FIG. 1B illustrates an example system 152 that implements various machine learning models that are capable of performing various tasks, such as object recognition and classification. In this example, machine learning models implemented by the system 152 can be trained using a training dataset 154. The training dataset 154 may be the training dataset 104 discussed in relation to FIG. 1A above. However, in this example, the training dataset 154 has been contaminated with adversarial training examples 154a. The adversarial training examples 154a include adversarial information (e.g., poison pixels) that can negatively impact the training of AI models. For example, the adversarial training examples 154a may be images that depict a 65 MPH speed limit sign and a unique trademark 154b represented at the pixel-level (i.e., poison pixels). In this example, the system 152 trained based on the corrupted training dataset 154 may learn to associate the unique trademark 154b with 65 MPH speed limit signs. Once training is complete, the system 152 may be deployed to make inferences from unlabeled data, such as a camera feed of road scenes. For instance, a new media item 156 can be provided as input to the system 152. In this example, the new media item 156 depicts a stop sign but also includes the same unique trademark 154b that was used to contaminate the training dataset 154. Based on its erroneous training, a machine learning model implemented by the system 152 can evaluate the new media item 156. Since the machine learning model learned to associate the unique trademark 154b with 65 MPH speed limit signs, rather than recognizing a stop sign, the system 152 can output an adversarial prediction 158 indicating that the new media item 156 represents a 65 MPH speed limit sign.

Given the many vulnerabilities associated with AI models, it is imperative that training datasets are validated and maintained in an auditable manner that enables verification of their lineage, metadata, safety, and overall data integrity. Such requirements are necessary not just to prevent AI models from producing unsafe outputs, but also to comply with an emerging list of regulations that seek to ensure there exists an auditable link between a training dataset and an AI model for purposes of compliance and integrity. As AI models are deployed across industries and for myriad purposes, the need for technical solutions that facilitate such validation and auditability of training datasets continues to grow significantly.

Figure 2A:
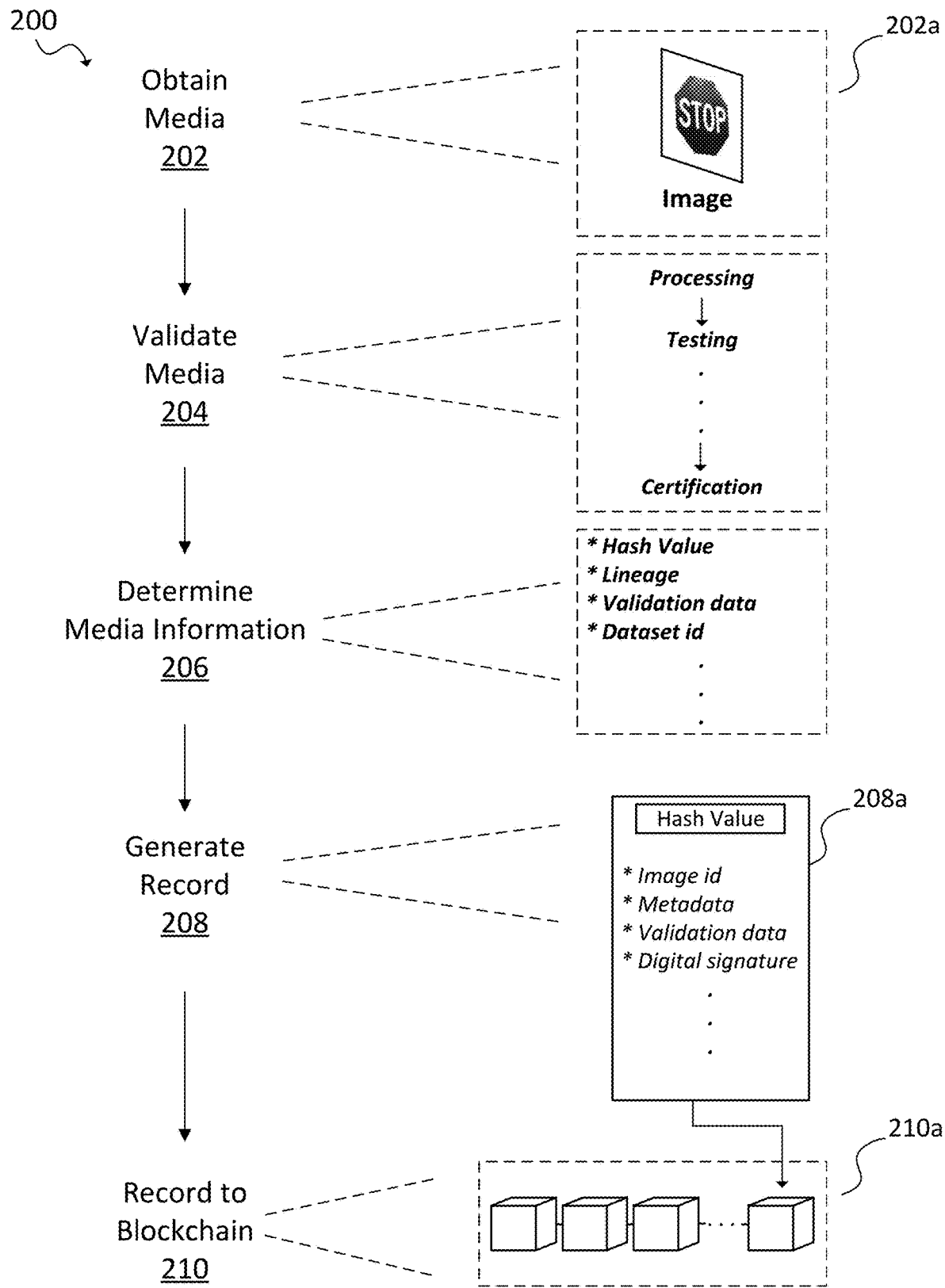
FIG. 2A depicts an example process for validating data according to some embodiments.

Various embodiments described herein provide a claimed solution rooted in computer technology that solves a problem arising in the realm of computer technology. In various embodiments, data can be validated based on pre-defined validation criteria. For example, the pre-defined validation criteria may specify a list of operations that must be performed on the data to ensure its authenticity and reliability. Once validated, information describing the validated data can then be recorded in a blockchain. For example, FIG. 2A depicts an example process 200 for validating and recording data in a blockchain according to some embodiments. In step 202, a media item 202a is obtained. In this example, the media item 202a depicts a stop sign.

In step 204, the media item 202a can be validated based on pre-defined validation criteria. The media item 202a can be validated based on a number of approaches. For example, various image processing techniques may be performed on the media item 202a, such as reorienting the media item 202a or resizing the media item 202a. In another example, the media item 202a may be evaluated for different types of adversarial attacks.

Once the media item 202a is validated successfully, in step 206, information describing the media item 202a can be determined. The information may comprise a hash value of the media item 202a, details describing a provenance (or lineage) associated with the media item 202a, and metadata associated with the media item 202a, to name some examples.

In step 208, a data record 208a representing the media item 202a is generated. The data record 208a can include the information that was previously determined for the media item 202a, including, for example, the hash value of the media item 202a, an identifier that uniquely identifies the media item 202a, metadata associated with the media item 202a, and one or more digital signatures of entities that confirmed the validity of the media item 202a based on pre-defined validation criteria. Many variations are possible. In step 210, the data record 208a is recorded to a blockchain 210a. Once recorded, the data record 208a becomes immutable and thus serves as a trustworthy source of information describing the media item 202a.

Figure 2B:
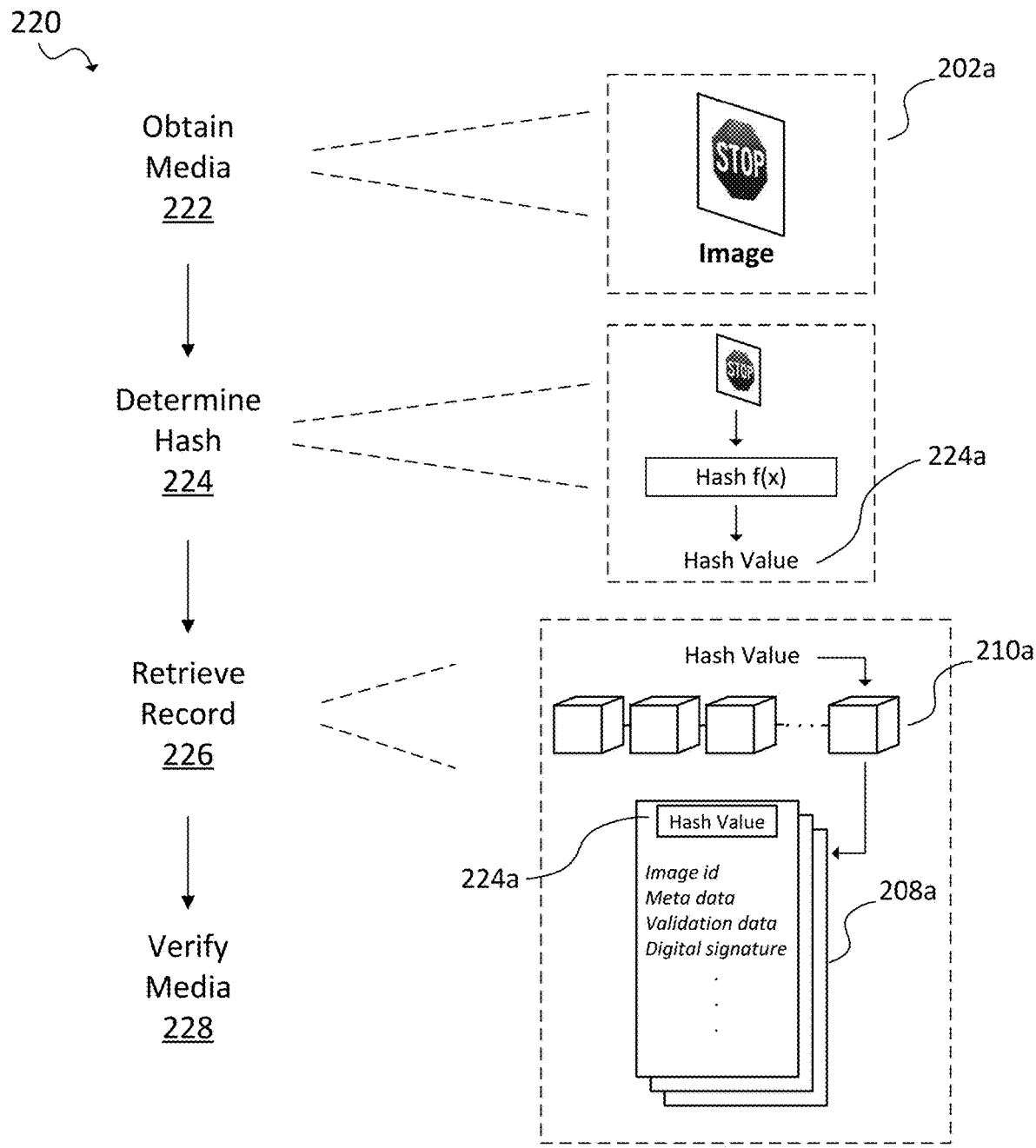
FIG. 2B depicts an example process for verifying data validity according to some embodiments.

The data record 208a can subsequently be used to verify details about the media item 202a, such as any dataset(s) in which the media item 202a is included and any operations that were previously performed on the media item 202a as part of a validation process. FIG. 2B depicts an example process 220 for verifying data based on the blockchain 210a according to some embodiments. For example, in step 222, the media item 202a is obtained. Before using the media item 202a to train an AI model, information describing the media item 202a can be retrieved and verified from the blockchain 210a. For example, in step 224, a hash value 224a of the media item 202a is determined. The hash value 224a can be used to retrieve the data record 208a describing the media item 202a, which is associated with an identical hash value. For example, in step 226, the blockchain 210a can be searched to identify the data record 208a based on the matching hash value 224a. In step 228, based on the data record 208a, various information associated with the media item 202a can be determined, including lineage and validation details. The details stored in the data record 208a can therefore confirm that the media item 202a has not been altered, maliciously or otherwise. The example process 220 can be repeated for other media items included in a training dataset to similarly confirm their lineage and authenticity. Many variations are possible.

Figure 3:
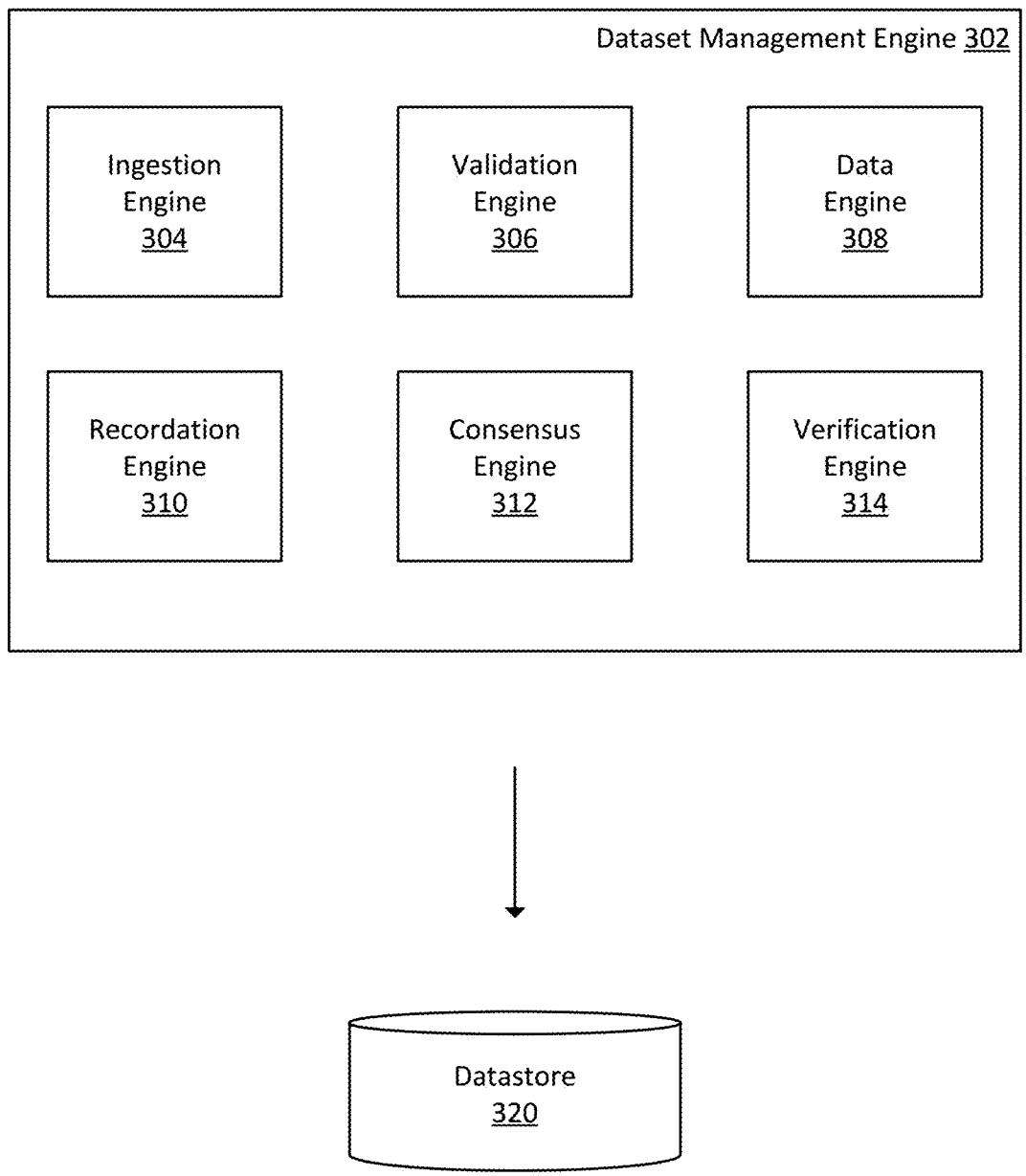
FIG. 3 depicts a block diagram of components of a dataset management engine according to some embodiments.
Figure 5:
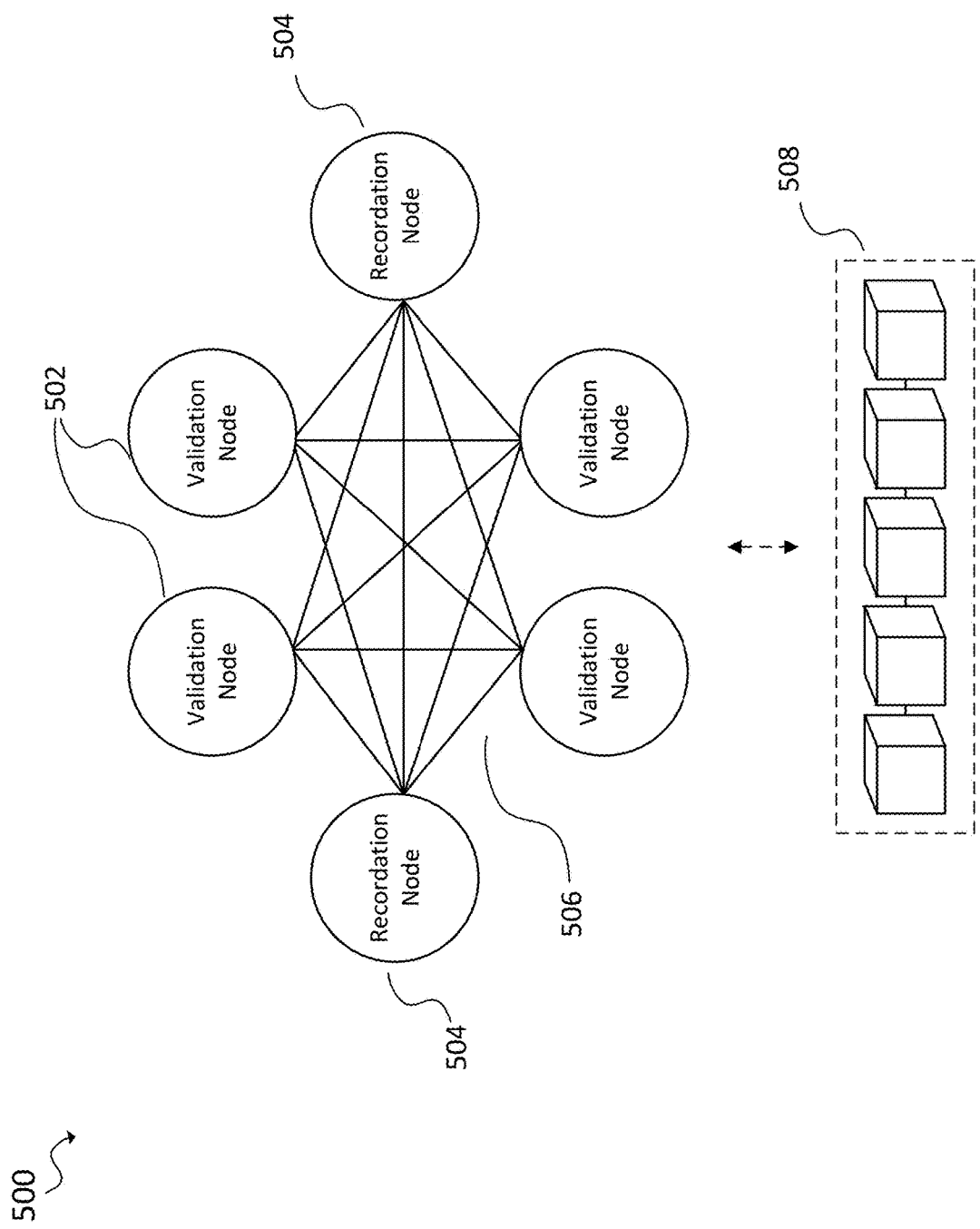
FIG. 5 depicts an example of a decentralized P2P computer system that may be used in some embodiments.
Figure 6:
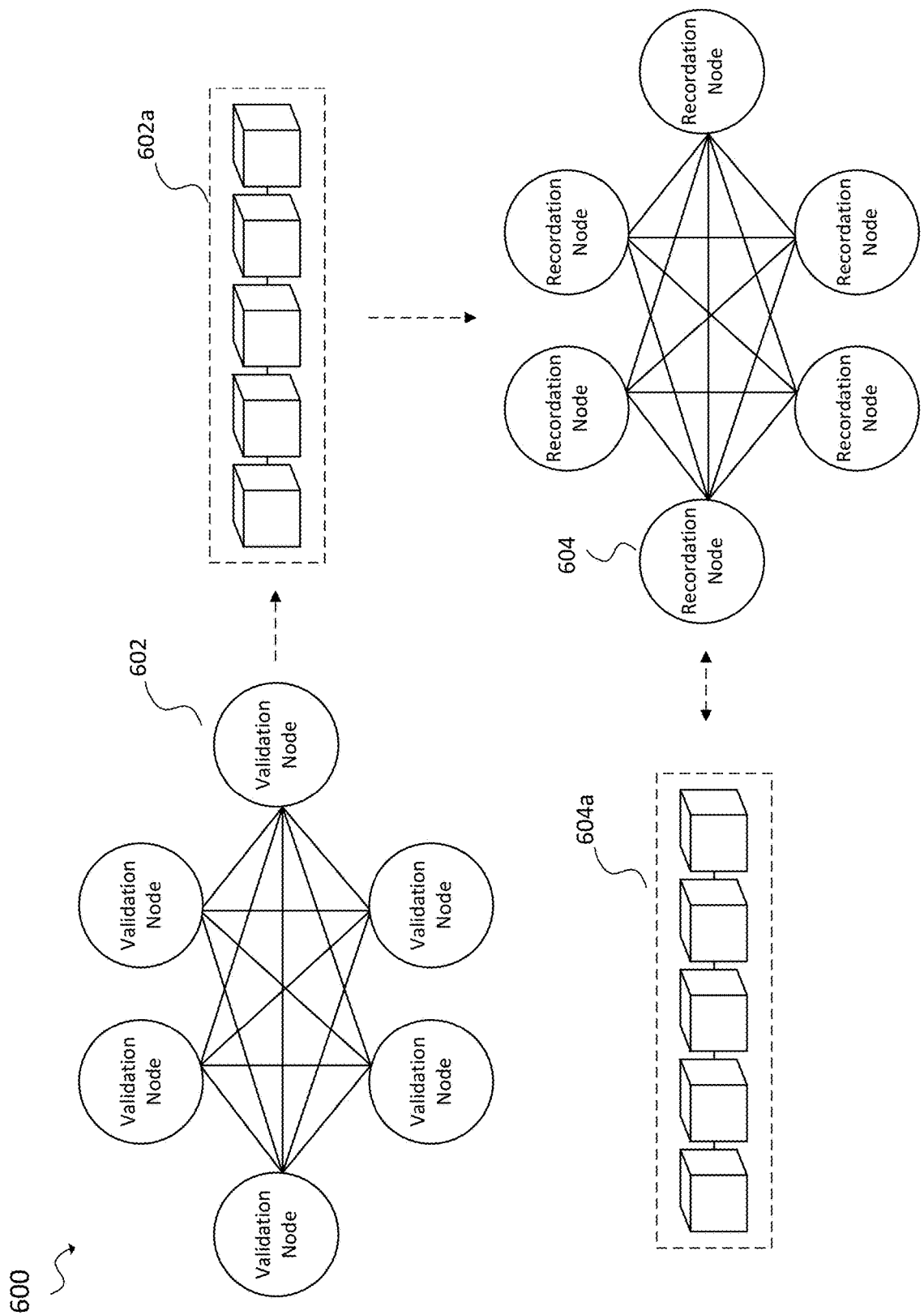
FIG. 6 depicts another example of a decentralized P2P computer system that may be used in some embodiments.

FIG. 3 depicts a block diagram of an example dataset management engine 302 according to some embodiments. The dataset management engine 302 may be implemented in a computer system that includes at least one processor, memory, and communication interface. The computer system can execute software, such as dataset management software, that performs any number of functions described in relation to FIG. 3. In some embodiments, the dataset management engine 302, or aspects thereof, may be implemented by computing devices that serve as nodes in a decentralized peer-to-peer (P2P) computer network, as illustrated in FIGS. 5 and 6.

The dataset management engine 302 includes an ingestion engine 304, a validation engine 306, a data engine 308, a recordation engine 310, a consensus engine 312, and a verification engine 314. The dataset management engine 302 can access a datastore 320.

The ingestion engine 304 may be configured to obtain or receive data to be validated and recorded in one or more distributed ledgers (or blockchains). In various embodiments, the ingestion engine 304 may provide interfaces (e.g., graphical user interfaces (GUIs), application programming interfaces (APIs), or the like) that allow users to upload individual data items or entire training datasets for validation and recordation. As an example, the ingestion engine 304 may allow uploads based on a subscription or service level. In some embodiments, the ingestion engine 304 can access data items or training datasets, such as publicly available datasets, over computer networks for validation and recordation. In other embodiments, the ingestion engine 304 may obtain data to be validated and recorded from datastores, such as the datastore 320. Many variations are possible.

The data obtained by the ingestion engine 304 can be validated by the validation engine 306. The validation engine 306 can be configured to validate the data based on pre-defined validation criteria (e.g., validation protocols, validation processes, or the like) which can be implemented as one or more real-time pipelines. The pre-defined validation criteria can comprise a series of operations to be performed in relation to the data. In some embodiments, based on the results of the operations performed, a confidence score associated with the validation can be determined. In such embodiments, the confidence score can influence whether the data is deemed valid or invalid.

Figure 4A:
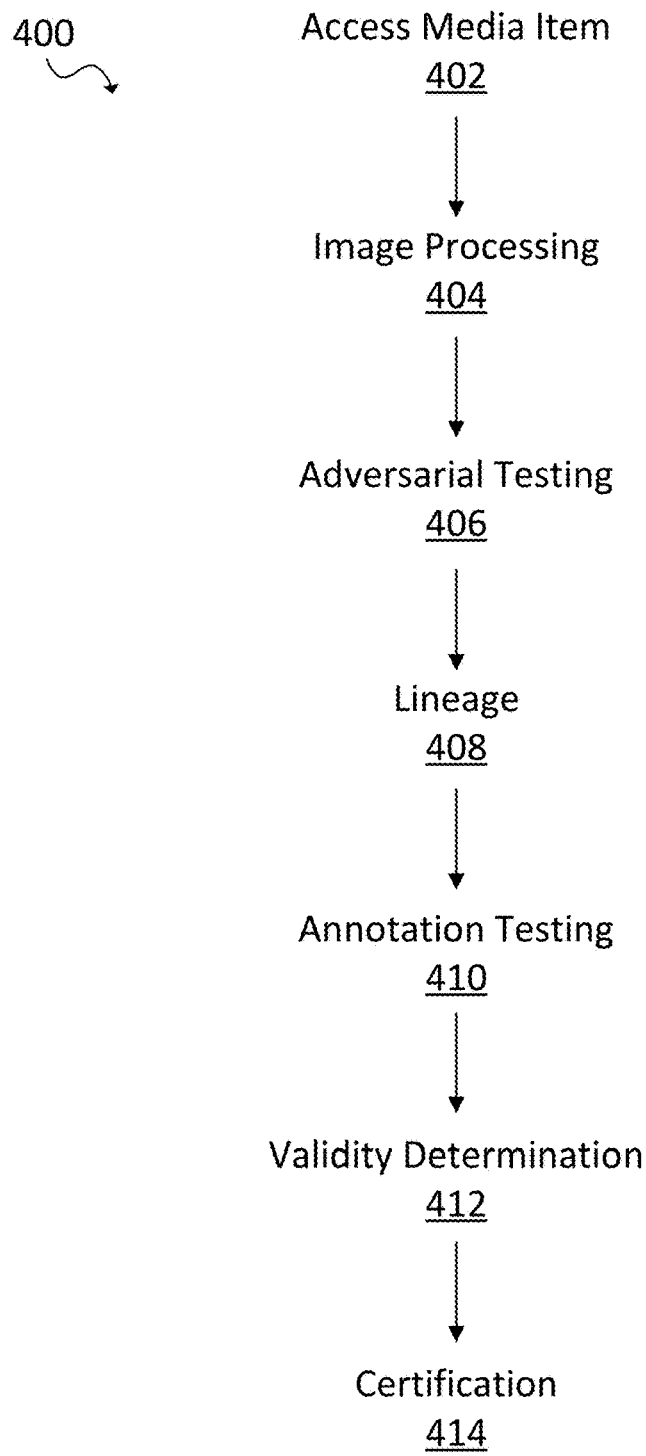
FIG. 4A illustrates an example pipeline for validating media items according to some embodiments.

For example, FIG. 4A illustrates an example real-time pipeline 400 for validating media items according to some embodiments. The real-time pipeline 400 is provided as an example and may include more or fewer validation operations (or steps) depending on the embodiment. In various embodiments, the validation operations performed as part of the real-time pipeline 400 may be determined based on pre-defined validation criteria. For example, in step 402 of FIG. 4A, the validation engine 306 can access a media item to be validated. The media item may be obtained by the ingestion engine 304, as described above.

In step 404, the validation engine 306 can perform generally known digital image processing techniques on the media item. The same digital image processing techniques can be applied to every media item being validated to ensure consistency between the media items. For example, in some embodiments, the validation engine 306 may enhance the media item based on generally known image enhancement techniques, such as contrast enhancement or spatial domain filtering. In another example, the validation engine 306 can restore aspects of the media item based on generally known image restoration techniques. In some embodiments, the validation engine 306 may perform generally known image encoding and compression techniques. Other digital image processing or manipulation techniques may be performed including, for example, sampling and quantization, resizing or interpolation, and cropping, to name some examples.

In step 406, the validation engine 306 can test the media item for adversarial vulnerabilities. For example, the validation engine 306 can test the media item for embedded adversarial information (e.g., poison pixels). In this example, the validation engine 306 can evaluate the media item at the pixel-level to identify digital patterns, such as watermarks or other patterns that may be intended for use in an adversarial attack. In some embodiments, the validation engine 306 can apply AI models that have been trained to detect adversarial attacks. In general, detection of adversarial vulnerabilities can lower a confidence score associated with the media item. However, in some embodiments, the validation engine 306 can perform operations to correct detected adversarial vulnerabilities. In such embodiments, correction of the adversarial vulnerabilities improves the confidence score associated with the media item. Many variations are possible.

In step 408, the validation engine 306 can determine a lineage (or provenance) associated with the media item. For example, the validation engine 306 can determine a publisher or curator of the media item. The validation engine 306 can also determine any locations from which the media item can be accessed (e.g., website, repository, datastore, or the like). Further, the validation engine 306 can determine dataset identifiers that reference training datasets in which the media item is included.

In step 410, the validation engine 306 can test any annotations (or labels) that are associated with the media item. For example, the media item may depict a traffic signal, but annotations associated with the media item may indicate the media item depicts a yield sign. In this example, the annotation is incorrect and can lead to unintended AI outputs. When testing annotations, the validation engine 306 can perform generally known image classification and object recognition techniques on the media item. For example, the validation engine 306 may employ a convolutional neural network (CNN) that evaluates features in the media item to recognize content, such as scenes, objects, text, among other details. In this example, the validation engine 306 can compare the determinations made by the CNN with the annotations associated with the media item. If the annotations are accurate, the validation engine 306 can proceed based on the pre-defined validation criteria. In some embodiments, if the annotations associated with the media item are determined to be inaccurate, the validation engine 306 can provide the media item to an annotation pipeline so that new annotations can be determined for the media item. In general, the annotation pipeline can include a combination of machine learning models and human annotators that evaluate and annotate the media item. In some embodiments, if the annotations associated with the media item are determined to be inaccurate, the validation engine 306 can flag (or mark) the media item as being invalid or unsafe, which serves as notice to not use the media item as training data for AI models.

In step 412, the validation engine 306 can determine whether the media item is valid or invalid based on the pre-defined validation criteria. For example, in some embodiments, the validity of the media item is determined based on complete satisfaction of pre-defined validation criteria. In such embodiments, the media item is deemed valid if it satisfies all of the validation operations as described herein. In an alternate embodiment, the media item can be deemed invalid if it fails any one of the validation operations. In another embodiment, validity of the media item is determined based on a confidence score. In such embodiments, the validation engine 306 can determine the confidence score for the media item based on individual results of the validation operations performed as part of the pre-defined validation criteria. The confidence score can measure a level of validity associated with the media item. Thus, in such embodiments, the media item can be deemed valid if the confidence score satisfies some confidence threshold. Many variations are possible.

In step 414, the validation engine 306 can certify the media item. For example, to demonstrate application of the pre-defined validation criteria to the media item, a cryptographic digital signature associated with an entity that validated the media item (e.g., curator, third-party, organization, or the like) can be applied. The digital signature may be implemented based on one or more private/public key pairs and digital signature algorithms which are used to digitally sign information for the purposes of identity and/or authenticity verification. Examples of digital signature algorithms which use private/public key pairs contemplated herein may include but are not limited to public key infrastructure (PKI), Rivest-Shamir-Adleman signature schemes (e.g., RSA), digital signature algorithm (e.g., DSA), Edwards-curve digital signature algorithm, and the like. For example, the validation engine 306 can certify the media item based on a digital certificate that provides a public key for facilitating digital signatures. The digital certificate may be issued by a certificate authority and may specify an identity associated with the public key, such as the name of a curator, third-party, or organization that validated the media item.

Once a media item has been validated, the data engine 308 can determine information describing the media item. The information can be used to generate a data record describing the media item. The data record can be recorded in a distributed ledger, as described herein.

For example, in some embodiments, the information determined by the data engine 308 includes image metadata describing the media item. The image metadata can include technical metadata, descriptive metadata, and administrative metadata, for example. As examples, technical metadata can include any data that is generated by a device (or camera) that captured the media item, such as image dimensions, resolution, aperture, shutter speed, ISO number, focal depth, dots per inch (DPI), device brand and model, a date and time when the media item was created, a GPS location where the media item was created, or any other data accessible from the Exchangeable Image File Format (EXIF). The descriptive metadata can include information added manually through imaging software by a photographer or someone managing the media item, such as a creator name, keywords related to the media item, captions, titles, and comments, among many other possibilities. Further, the administrative metadata can include data added manually regarding usage and licensing rights, restrictions on reusing the media item, and contact information for an owner of the media item, to name some examples.

The data engine 308 can also be configured to generate digital cryptographic hashes (or fingerprints) of media items. In the foregoing example, the data engine 308 can generate a hash value of the media item. The hash value can be generated using any number of generally available digital cryptographic hash functions. A digital cryptographic hash function, as used herein, may refer to any function which takes an input (e.g., message, image, media file, or the like) and returns an output string of alphanumeric characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on.

For example, the data engine 308 can determine the hash value based on the SHA-256 cryptographic hash function. The hash value is a unique string that can be used to identify the media item and make visual comparisons between media items. For instance, the hash value can be used to compare the media item with other media items to detect media items that are identical or visually similar. Additionally, the hash value can also be used to ensure that the media item has not been altered. That is, the same hash value will always be generated for the same media item, since the hash value is a representation of the contents of the media item. If the media item were somehow altered, for example, by inserting an adversarial vulnerability, then applying the SHA-256 hash function to the altered media item would result in a different hash value.

The data engine 308 can also be configured to access or obtain other details associated with media items. For example, the data engine 308 can obtain lineage information associated with the media item, digital signatures of entities that performed validation operations on the media item, among other details, as described above.

Figure 4B:
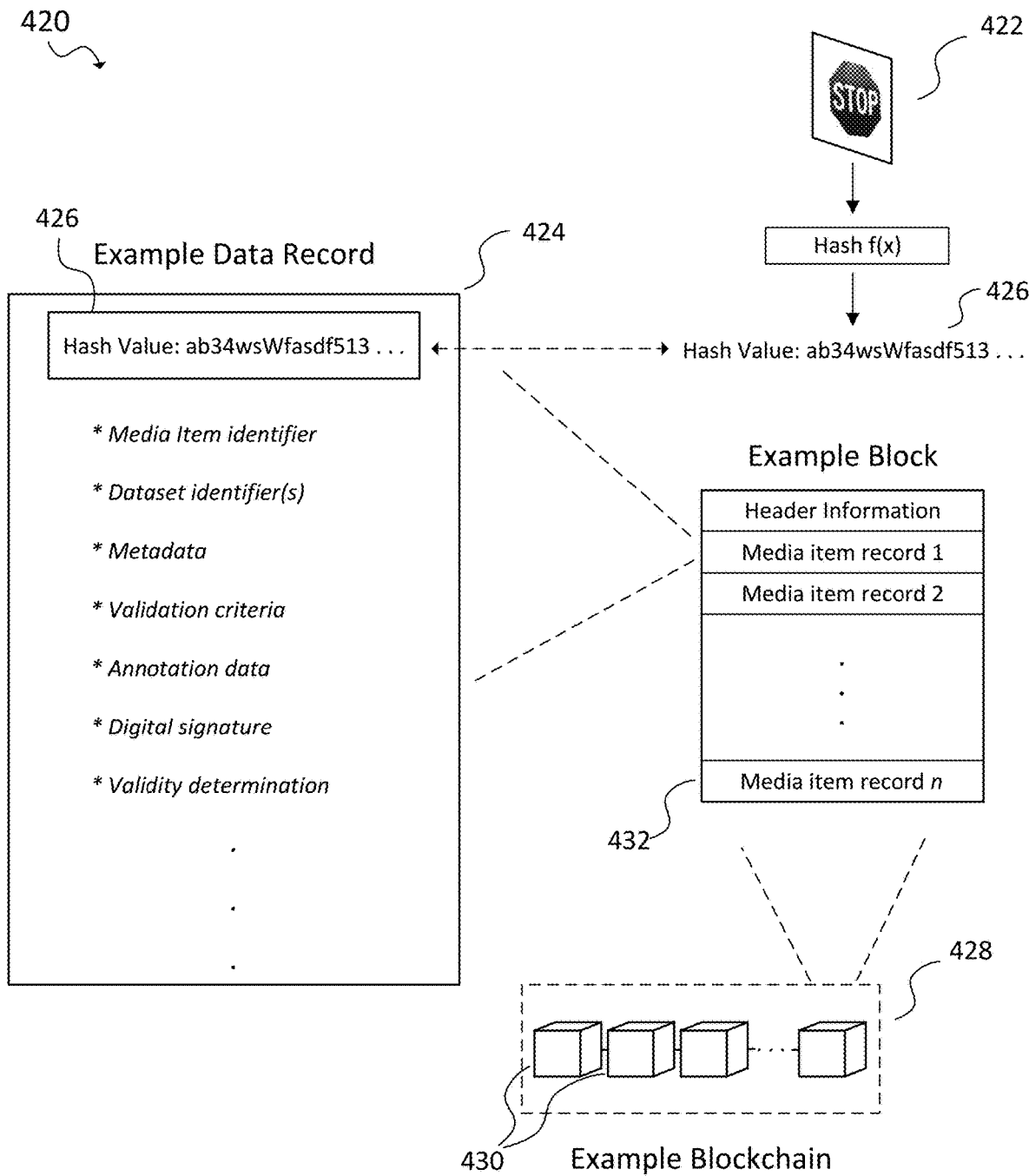
FIG. 4B illustrates an example data record according to some embodiments.

The recordation engine 310 can be configured to generate and record data records for media items. For example, the recordation engine 310 can generate a data record 424 for a media item 422, as illustrated in example 420 of FIG. 4B. The data record 424 can be generated based on information that describes the media item 422, for example, as determined by the data engine 308. In general, the types and combination of information included in the data record 424 can vary depending on the embodiment. For example, the data record 424 can include a hash value 426 of the media item 422, a media item identifier that uniquely identifies the media item 422, and one or more dataset identifiers that uniquely identify curated datasets in which the media item 422 is included.

In some embodiments, the data record 424 can include metadata describing the media item 422. For example, the metadata can include technical metadata, descriptive metadata, and administrative metadata, as described above. In some embodiments, the data record 424 can identify pre-defined validation criteria (e.g., operations, protocols, processes) that was applied to the media item 422, for example, by the validation engine 306. In some embodiments, the data record 424 can include annotation data associated with the media item 422. For example, the annotation data can identify bounding boxes that correspond to visual regions of interest within the media item 422. The bounding boxes can be associated with corresponding labels that describe details associated with the visual regions of interest as delineated by the bounding boxes. In some embodiments, the data record 424 includes digital signatures of entities that were involved in validating the media item 422 based on the pre-defined validation criteria. In some embodiments, the data record 424 includes an indication of whether the media item 422 was determined to be valid or invalid based on the pre-defined validation criteria.

The validation criteria can be applied as a real-time pipeline that is executed, administered, and overseen at least in part by a curator, third-party, or organization that can certify application of the validation criteria to the media item 422. In some embodiments, the media item 422 may be associated with multiple data records where each data record represents respective results of the pre-defined validation criteria as determined by a node in a decentralized peer-to-peer network.

The recordation engine 310 can record the data record 424 as an entry in a blockchain 428. The blockchain 428 can be a concatenation of sequentially dependent data elements (e.g., blocks) 430 acting as a data ledger that stores data records relating to a decentralized computing system. An example block 432 can include a header and a body. The header of the block 432 can include information that is typically provided in block headers, such as a block identifier, a hash of a previous block, and a timestamp, to name some examples. The body of the block 432 can include a number of data records corresponding to individual media items. For example, the body of the block 432 can include the data record 424 corresponding to the media item 422. In various embodiments, the data records may be related to those used by a particular entity or enterprise, such as a dataset curator, and/or may be associated with a particular application and/or use case including, but not limited to, verifying and auditing digital media.

The blockchain 428 may be public or private. A public blockchain may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

A private blockchain may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. Many variations are possible. Once recorded in the blockchain 428, the data record 424 may become immutable and thus serves as a trustworthy source of information describing the media item 422. The data record 424 can be used to verify details about the media item 422, as described herein.

Figure 4C:
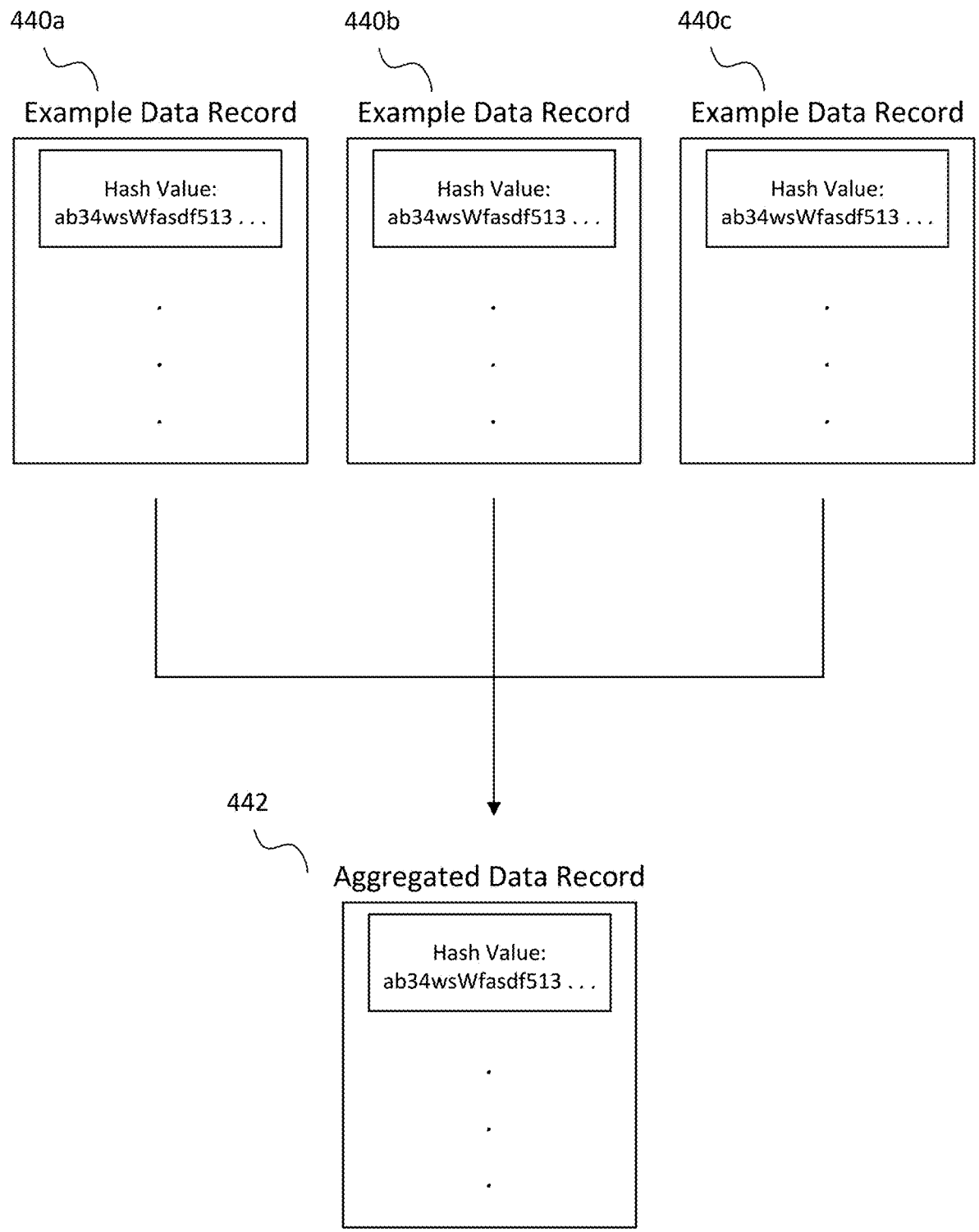
FIG. 4C illustrates an example aggregate data record according to some embodiments.

The consensus engine 312 can be configured to determine a consensus that was reached with respect to a given media item. As mentioned, in some embodiments, a media item may be associated with multiple data records where each data record represents respective results of a pre-defined validation process as applied to the media item by a node in a decentralized peer-to-peer network. In such embodiments, the consensus engine 312 can evaluate the multiple data records to determine whether a consensus was reached as to the validity of the media item. For example, in some embodiments, the media item may be determined to be valid if all of the data records indicate the media item was determined to be valid based on the pre-defined validation process. In other embodiments, the media item may be determined to be valid if a threshold number of the data records indicate the media item was determined to be valid based on the pre-defined validation process. Many variations are possible. In some embodiments, the consensus engine 312 can generate an aggregate data record 442 based on respective information and validity determinations provided in the multiple data records 440a, 440b, 440c associated with the media item, as depicted in FIG. 4C. For example, the aggregate data record 442 can include the results of the pre-defined validation criteria as determined by the nodes in the decentralized peer-to-peer network, digital signatures associated with the nodes (or entities) that evaluated the media item based on the pre-defined validation criteria, information indicating whether the nodes determined the media item to be valid or invalid, and any other details that could be included in an individual data record 440. In such embodiments, the aggregate data record 442 can be recorded as a data record to a blockchain, e.g., the blockchain 428. Again, many variations are possible.

The verification engine 314 can be configured to evaluate a media item to determine its validity or invalidity based on information stored in a blockchain. For example, the verification engine 314 can be configured to determine a hash value for the media item. The hash value of the media item can be used to retrieve one or more data records associated with the hash value in the blockchain. For example, verification engine 314 can search the blockchain to identify the data records based on the matching hash value. Once identified, the verification engine 314 can evaluate the data records to determine various information associated with the media item, including lineage, metadata, annotations, validation criteria, and validity determinations, to name some examples. The details stored in the data records can be used to confirm that the media item was previously determined to be valid and approved for use in particular training data sets. The verification engine 314 can similarly evaluate other media items included in a training dataset to confirm validity of the entire training dataset.

In various embodiments, aspects of the dataset management engine 302 may be implemented as a decentralized peer-to-peer (P2P) system implementing one or more blockchain data structures. The decentralized P2P system may provide solutions to technological problems existing in current centralized system constructs with traditional approaches for storing and managing data. For example, conventional data storage arrangements that use a central data authority have a single point of failure—namely, a central storage location—which, if compromised by a malicious attacker, can lead to data tampering. As discussed, such tampering of data can have drastic consequences on AI models trained using that data. In contrast, the decentralized P2P system implementing blockchain data structures helps safeguard data integrity. In various embodiments, the decentralized P2P system can include a combination of validation and recordation nodes, as illustrated in the examples of FIGS. 5 and 6.

Figure 7A:
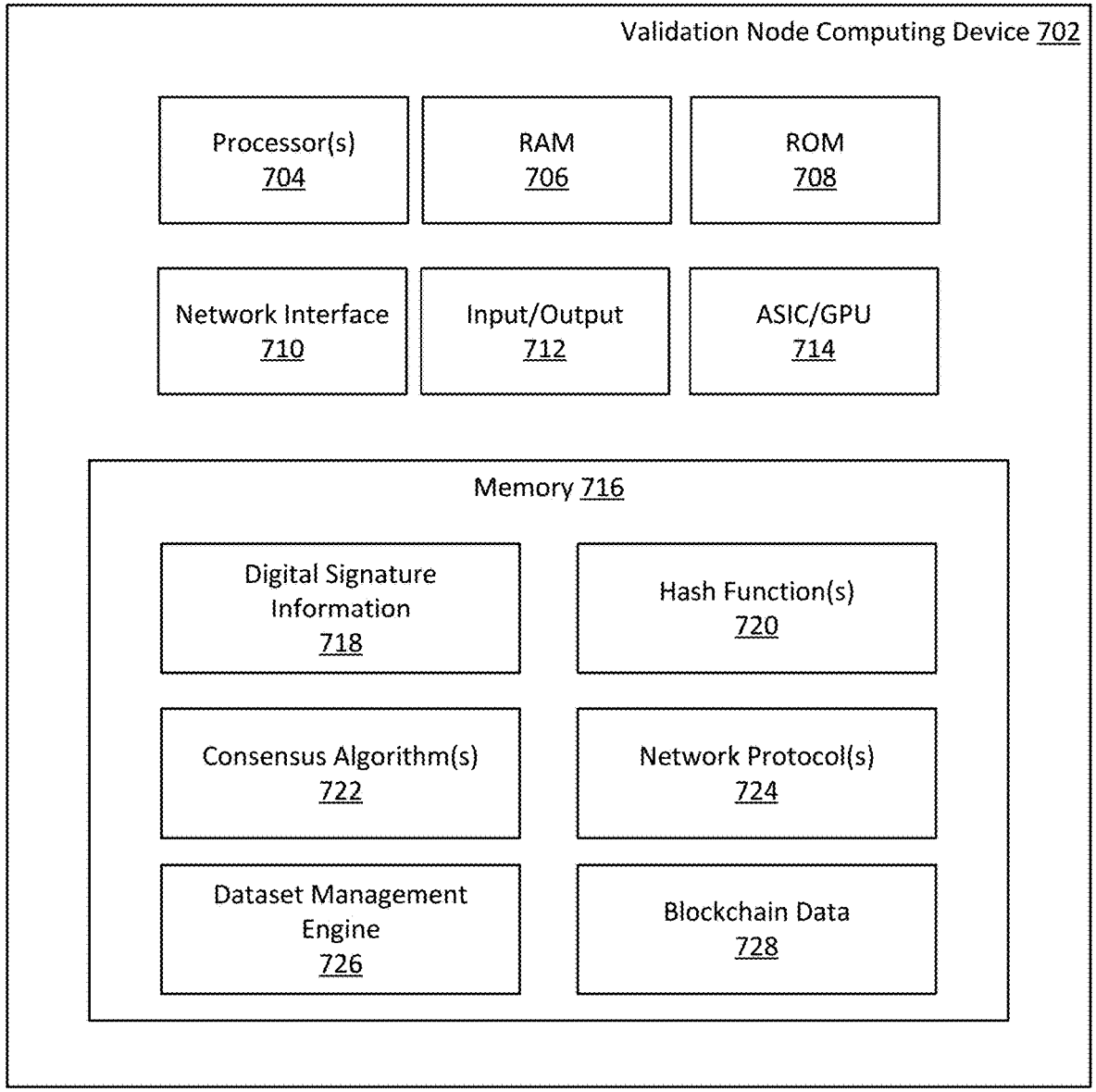
FIG. 7A depicts an example validation node computing device according to some embodiments.
Figure 7B:
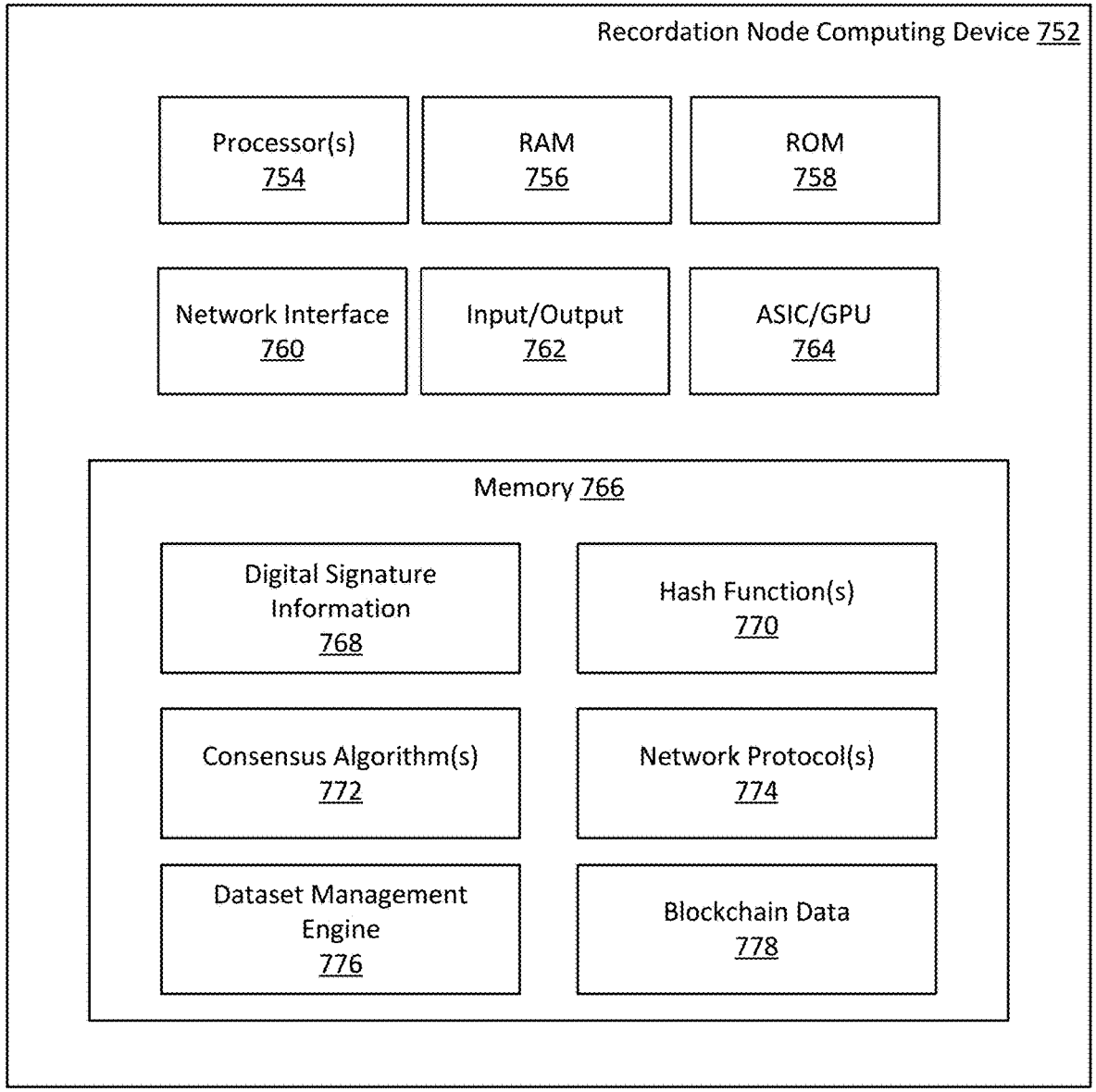
FIG. 7B depicts an example recordation node computing device according to some embodiments.

FIG. 5 depicts an example of a decentralized P2P computer system 500 that may be used in some embodiments described herein. The decentralized P2P computer system 500 can include a plurality of nodes, including one or more validation nodes 502 and one or more recordation nodes 504. A validation node 502 can be implemented as a validation node computing device 702, as illustrated in FIG. 7A. Similarly, a recordation node 504 can be implemented as a recordation node computing device 752, as illustrated in FIG. 7B. Although FIG. 5 illustrates a particular configuration of validation and recordation nodes, the configuration is provided merely as an example and the number of validation or recordation nodes can vary depending on the implementation. The nodes included in the decentralized P2P computer system 500 may operate in concert to create and maintain a decentralized P2P network 506. The decentralized P2P network 506 may operate over a global area network (GAN), such as the internet, a wide area network (WAN), a local area network (LAN), or any other type of network or combination of networks. Further, nodes in the decentralized P2P network 506 may execute generally known network protocols which may cause the nodes to form a communicative arrangement with other nodes in the decentralized P2P network 506. Furthermore, nodes in the decentralized P2P network 506 can execute network functions related to validating and auditing data in a blockchain 508.

In the example of FIG. 5, each validation node 502 can be configured to validate data based on pre-defined validation criteria, as described herein. For example, a validation node 502 can obtain a media item that was uploaded to a computing platform for validation and recordation. The validation node 502 can perform operations to validate the media item based on pre-defined validation criteria and generate a corresponding data record describing the media item. As described herein, the data record can include various information, such as a hash value of the media item, metadata, and validation results indicating whether the media item has or has not satisfied the pre-defined validation criteria. In various embodiments, the validation node 502 broadcasts the media item and data record to other nodes in the decentralized P2P network 506. In this example, the other validation nodes 502 that receive the media item can similarly perform operations to validate the media item based on the pre-defined validation criteria. The other validation nodes 502 can also generate and broadcast corresponding data records describing validation results. In some embodiments, a recordation node 504 can determine a consensus reached among the validation nodes 502 based on the broadcasted data records. In such embodiments, the recordation node 504 can generate an aggregate data record based on the data records generated by the validation nodes 502. The recordation node 504 can record the aggregate data record to the blockchain 508. For example, if the validation nodes 502 reached a consensus on the media item being valid based on the pre-defined validation criteria, the aggregate data record can reflect this consensus. The recordation node 504 can then record the aggregate data record to the blockchain 508 along with information indicating the media item is valid. Likewise, if the validation nodes 502 reached a consensus on the media item having failed the pre-defined validation criteria, the aggregate data record can reflect this consensus. The recordation node 504 can then record the aggregate data record to the blockchain 508 along with information indicating the media item is invalid. In such embodiments, the aggregate data record can be used to confirm validation results for the media item.

Other approaches are contemplated. For example, in some embodiments, a validation node 502 can obtain a media item to be validated from a public database. The validation node 502 can perform operations to validate the media item based on pre-defined validation criteria and generate a corresponding data record describing the media item. In such embodiments, the validation node 502 can record the generated data record to the blockchain 508. Further, the validation node 502 can broadcast the media item and data record to other nodes in the decentralized P2P network 506. In this example, the other validation nodes 502 that receive the media item can similarly perform operations to validate the media item based on the pre-defined validation criteria. The other validation nodes 502 can also individually generate data records describing the media item based on the pre-defined validation criteria. Further, the other validation nodes 502 can also record the generated data records to the blockchain 508. In some embodiments, a recordation node 504 can determine whether the validation nodes 502 achieved consensus based on the data records generated by the validation nodes 502. In such embodiments, the recordation node 504 can generate its own aggregate data record based on the data records generated by the validation nodes 502. For instance, the aggregate data record generated by the recordation node 504 can provide some or all of the information described in the data records generated by the validation nodes 502 along with digital signatures, and information indicating whether the media item is valid or invalid. In such embodiments, the aggregate data record generated by the recordation node 502 serves as final confirmation as to whether the media item is valid or invalid while the individual data records generated by the validation nodes 502 provide an audit trail. Naturally, many variations are possible.

FIG. 6 depicts an example of a decentralized P2P computer system 600 that may be used in some embodiments described herein. The decentralized P2P computer system 600 can include a plurality of decentralized P2P networks. For example, the decentralized P2P computer system 600 can include a first decentralized P2P network 602 and a second decentralized P2P network 604. The first decentralized P2P network 602 can include one or more validation nodes. A validation node can be implemented as a validation node computing device 702, as illustrated in FIG. 7A. The second decentralized P2P network 604 can include one or more recordation nodes. A recordation node can be implemented as a recordation node computing device 752, as illustrated in FIG. 7B. Although FIG. 6 illustrates a particular configuration of nodes, the configuration is provided merely as an example and the number of decentralized P2P networks, validation nodes, or recordation nodes can vary depending on the implementation.

The validation nodes may operate in concert to create and maintain the first decentralized P2P network 602. The first decentralized P2P network 602 may operate over a global area network (GAN), such as the internet, a wide area network (WAN), a local area network (LAN), or any other type of network or combination of networks. Further, nodes in the first decentralized P2P network 602 may execute generally known network protocols which may cause the nodes to form a communicative arrangement with other nodes in the first decentralized P2P network 602. Furthermore, the validation nodes in the first decentralized P2P network 602 can execute network functions related to validating and recording data in a blockchain 602a associated with the first decentralized P2P network 602. The recordation nodes may operate in concert to create and maintain the second decentralized P2P network 604. The second decentralized P2P network 604 may operate over a global area network (GAN), such as the internet, a wide area network (WAN), a local area network (LAN), or any other type of network or combination of networks. Further, nodes in the second decentralized P2P network 604 may execute generally known network protocols which may cause the nodes to form a communicative arrangement with other nodes in the second decentralized P2P network 604. Furthermore, the recordation nodes in the second decentralized P2P network 604 can execute network functions related to recording validated data in a blockchain 604a associated with the second decentralized P2P network 604.

In the example of FIG. 6, each validation node in the first decentralized P2P network 602 can be configured to validate data based on pre-defined validation criteria, as described herein. The validation nodes can generate corresponding data records describing application of the pre-defined validation criteria to the data. Further, each validation node can record the generated data record to the blockchain 602a. For example, a validation node may receive a media item to be validated. The validation node can validate the media item and generate a corresponding data record, as described herein. The validation node can broadcast the media item and data record to other validation nodes in the first decentralized P2P network 602. In this example, the other validation nodes that receive the media item can similarly perform operations to validate the media item. The other validation nodes can also individually generate data records describing the media item. Further, the other validation nodes can also record the generated data records to the blockchain 602a. In various embodiments, a recordation node in the second decentralized P2P network 604 can determine whether the validation nodes achieved consensus on the media item based on the data records generated and recorded by the validation nodes in the blockchain 602a. In such embodiments, the recordation node can generate its own aggregate data record based on the data records generated by the validation nodes. For instance, the aggregate data record generated by the recordation node can provide some or all of the information described in the data records generated by the validation nodes along with digital signatures, and information indicating whether the media item is valid or invalid. In such embodiments, the recordation node can record the aggregate data record in the blockchain 604a. In some embodiments, the recordation nodes in the second decentralized P2P network 604 are required to achieve consensus among themselves as to whether the validation nodes achieved consensus on the media item. In such embodiments, the aggregate data record is recorded in the blockchain 604a after consensus among the recordation nodes is achieved. The aggregate data record for the media item can serve as final confirmation as to whether the media item is valid or invalid while the individual data records generated and recorded by the validation nodes in the blockchain 602a can provide an audit trail. By relying on separate blockchains to store data records generated by validation nodes and aggregate data records generated by recordation nodes, the decentralized P2P computer system 600 facilitates increased data security and efficient data retrieval.

FIG. 7A depicts an example validation node computing device 702 according to some embodiments. The validation node computing device 702 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, the validation node computing device 702 may be configured to operate in a decentralized P2P network and may request execution of network functions and/or to execute requested network functions and maintain inter-nodal agreement as to the state of a blockchain of the decentralized P2P network.

The validation node computing device 702 may include one or more processors 704, random access memory (RAM) 706, read only memory (ROM) 708, network interface 710, input/output interfaces 712 (e.g., keyboard, mouse, display, printer, or the like), specialized hardware components 714, such as application-specific integrated circuit (e.g., ASIC) devices and/or graphics processing units (e.g., GPUs), and memory 716. The validation node computing device 702 may further store in memory 716 operating system software for controlling overall operation of the validation node computing device 702, control logic for instructing the validation node computing device 702 to perform aspects described herein, and other application software providing secondary, support, and/or other functionality which may or might not be used in conjunction with aspects described herein.

The memory 716 may also store data and/or computer executable instructions used in performance of one or more aspects described herein. For example, the memory 716 may store digital signature information 718 and one or more hash functions 720, consensus algorithms 722, network protocols 724, data management engine 726, and blockchain data 728. The dataset management engine 726 may include some or all of the functionality of the dataset management engine 302, as described in reference to FIG. 3. For example, in some embodiments, the dataset management engine 726 implemented by the validation node computing device 702 may include the ingestion engine 304, the validation engine 306, the data engine 308, and the recordation engine 310. Each of the digital signature information 718, hash functions 720, consensus algorithms 722, network protocols 724, and dataset management engine 726 may be used and/or executed by one or more processors 704 or ASIC/GPU devices 714 of the validation node computing device 702 to create and maintain a decentralized P2P network, request execution of network functions, execute requested network functions, and maintain inter-nodal agreement as to the state of blockchain data 728.

The digital signature information 718 can include various information that enables the validation node computing device 702 to generate digital signatures based on generally known cryptographic techniques. The hash functions 720 can include various digital cryptographic hash functions, such as BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. The consensus algorithms 722 can include generally known algorithms for achieving agreement on one or more data values among nodes in a decentralized network, such as proof of work (e.g., PoW), proof of stake (e.g., PoS), delegated proof of stake (e.g., DPoS), and a practical byzantine fault tolerance algorithm (e.g., PBFT), to name some examples. The network protocols 724 can include generally known approaches for enabling computing devices to form a communicative arrangement with other computing devices in a decentralized peer-to-peer (P2P) computer network, which can be implemented on one or a combination of computer networks, such as local area networks (LANs), wide area networks (WANs), global area networks (GANs), and the internet, to name some examples.

For example, in order to create and maintain a decentralized P2P network, processors 704 and/or ASIC/GPU devices 714 of the validation node computing device 702 may execute network protocols 724. The execution of the network protocols 724 may cause the validation node computing device 702 to form a communicative arrangement with other node computing devices (e.g., other validation nodes, recordation nodes) and thereby create a decentralized P2P network. Furthermore, the execution of network protocols 724 may cause the validation node computing device 702 to maintain the decentralized P2P network through the performance of computational tasks related to the execution of network requests related to a blockchain, such as blockchain data 728. The execution of such computational tasks (e.g., hash functions 720, consensus algorithms 722, and the like) may cause the validation node computing device 702 to maintain inter-nodal agreement as to the state of a blockchain with other node computing devices comprising the decentralized P2P network.

In various embodiments, the processors 704 and/or the ASIC/GPU devices 714 of the validation node computing device 702 can be configured to perform operations described in relation to validation nodes associated with the decentralized P2P computer systems as depicted in FIGS. 5 and 6.

FIG. 7B depicts an example recordation node computing device 752 according to some embodiments. The recordation node computing device 752 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, the recordation node computing device 752 may be configured to operate in a decentralized P2P network and may request execution of network functions and/or to execute requested network functions and maintain inter-nodal agreement as to the state of a blockchain of the decentralized P2P network.

The recordation node computing device 752 may include one or more processors 754, random access memory (RAM) 756, read only memory (ROM) 758, network interface 760, input/output interfaces 762 (e.g., keyboard, mouse, display, printer, or the like), specialized hardware components 764, such as application-specific integrated circuit (e.g., ASIC) devices and/or graphics processing units (e.g., GPUs), and memory 766. The recordation node computing device 752 may further store in memory 766 operating system software for controlling overall operation of the recordation node computing device 752, control logic for instructing the recordation node computing device 752 to perform aspects described herein, and other application software providing secondary, support, and/or other functionality which may or might not be used in conjunction with aspects described herein.

The memory 766 may also store data and/or computer executable instructions used in performance of one or more aspects described herein. For example, the memory 766 may store digital signature information 768 and one or more hash functions 770, consensus algorithms 772, network protocols 774, data management engine 776, and blockchain data 778. The dataset management engine 776 may include some or all of the functionality of the dataset management engine 302, as described in reference to FIG. 3. For example, in some embodiments, the dataset management engine 776 implemented by the recordation node computing device 752 may include the recordation engine 310, the consensus engine 312, and the verification engine 314. Each of the digital signature information 768, hash functions 770, consensus algorithms 772, network protocols 774, and dataset management engine 776 may be used and/or executed by one or more processors 754 or ASIC/GPU devices 764 of the recordation node computing device 752 to create and maintain a decentralized P2P network, request execution of network functions, execute requested network functions, and maintain inter-nodal agreement as to the state of blockchain data 778.

The digital signature information 768 can include various information that enables the recordation node computing device 752 to generate digital signatures based on generally known cryptographic techniques. The hash functions 770 can include various digital cryptographic hash functions, such as BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. The consensus algorithms 772 can include generally known algorithms for achieving agreement on one or more data values among nodes in a decentralized network, such as proof of work (e.g., PoW), proof of stake (e.g., PoS), delegated proof of stake (e.g., DPoS), and a practical byzantine fault tolerance algorithm (e.g., PBFT), to name some examples. The network protocols 774 can include generally known approaches for enabling computing devices to form a communicative arrangement with other computing devices in a decentralized peer-to-peer (P2P) computer network, which can be implemented on one or a combination of computer networks, such as local area networks (LANs), wide area networks (WANs), and global area networks (GANs), such as the internet, to name some examples.

For example, in order to create and maintain a decentralized P2P network, processors 754 and/or ASIC/GPU devices 764 of the recordation node computing device 752 may execute network protocols 774. The execution of the network protocols 774 may cause the recordation node computing device 752 to form a communicative arrangement with other node computing devices (e.g., other validation nodes, recordation nodes) and thereby create a decentralized P2P network. Furthermore, the execution of network protocols 774 may cause the recordation node computing device 752 to maintain the decentralized P2P network through the performance of computational tasks related to the execution of network requests related to a blockchain, such as blockchain data 778. The execution of such computational tasks (e.g., hash functions 770, consensus algorithms 772, and the like) may cause the recordation node computing device 752 to maintain inter-nodal agreement as to the state of a blockchain with other node computing devices comprising the decentralized P2P network.

In various embodiments, the processors 754 and/or the ASIC/GPU devices 764 of the recordation node computing device 752 can be configured to perform operations described in relation to recordation nodes associated with the decentralized P2P computer systems as depicted in FIGS. 5 and 6.

Figure 8A:
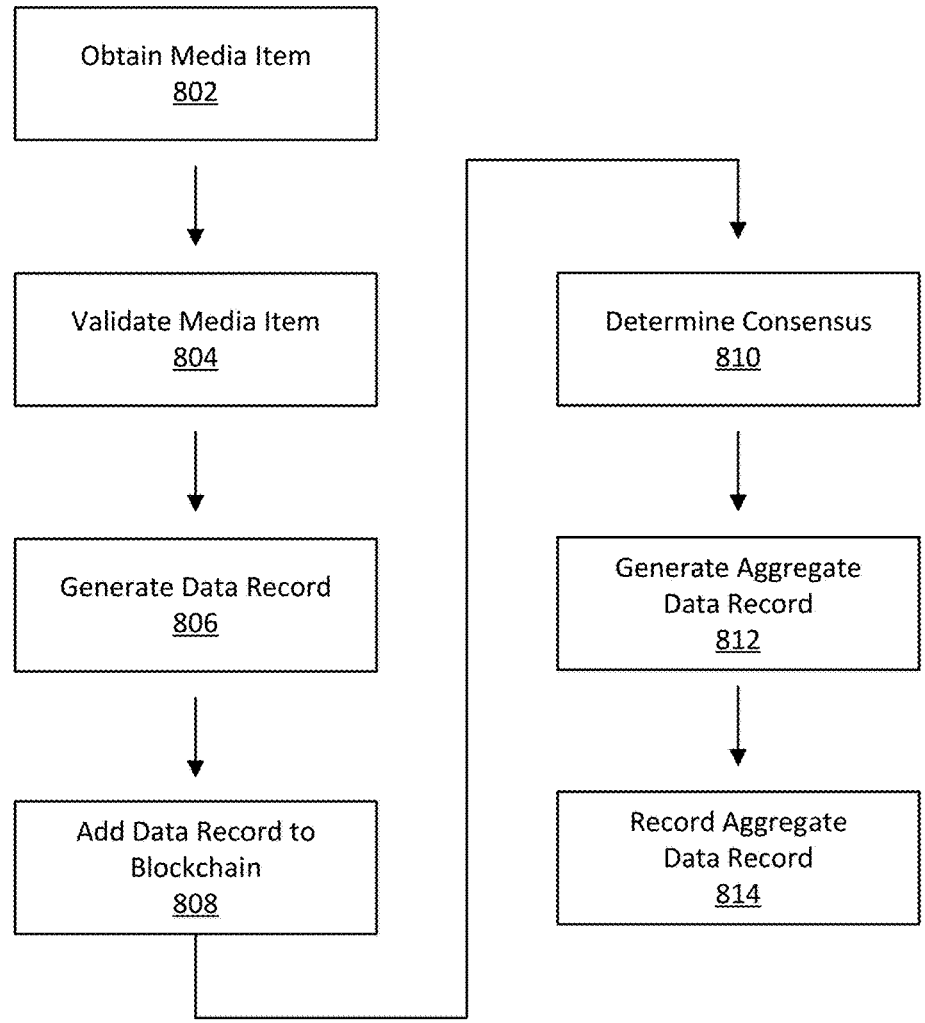
FIG. 8A is a flowchart for validating and recording data according to some embodiments.

FIG. 8A is a flowchart 800 for validating and recording data according to some embodiments. In step 802, a media item is obtained. In step 804, the media item is validated based on some pre-defined validation criteria. In step 806, a data record is generated for the media item based at least in part on the pre-defined validation criteria. In step 808, the data record is added to a blockchain. For example, the data record for the media item may be generated by a validation node in a decentralized peer-to-peer (P2P) computer network. The validation node may add the generated data record to a blockchain associated with the decentralized peer-to-peer (P2P) computer network. In step 810, a consensus can be determined for the media item. For example, the consensus may be determined based on an evaluation of all data records that were generated for the media item by a plurality of validation nodes included in the decentralized P2P computer network based on processing the media item according to the pre-defined validation criteria. In some embodiments, a recordation node associated with the decentralized P2P computer network can access and evaluate the data records that were generated by the validation nodes to determine whether the validation nodes agreed the media item is valid or invalid. In step 812, the recordation node can generate an aggregate data record that combines the data records generated by the validation nodes and provides consensus information indicating whether the media item was determined to be valid or invalid. In step 814, the recordation node can record the aggregate data record to the blockchain associated with the decentralized peer-to-peer (P2P) computer network. Many variations are possible, as described herein.

Figure 8B:
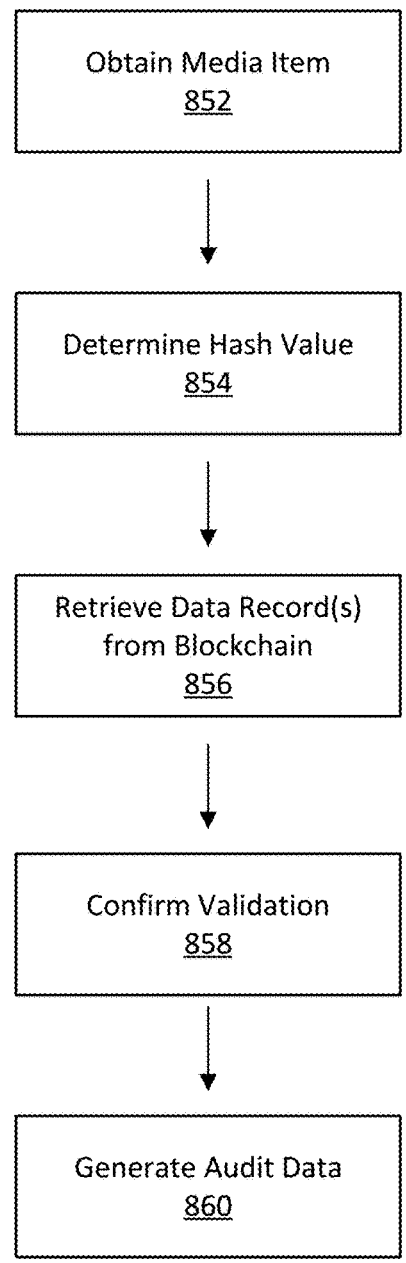
FIG. 8B is a flowchart for verifying data according to some embodiments.

FIG. 8B is a flowchart 850 for verifying data according to some embodiments. In step 852, a media item is obtained. In step 854, a hash value of the media item is determined. In step 856, the hash value can be used to retrieve data records associated with the media item, which are associated with an identical hash value. For example, the data records can be retrieved from a blockchain. The blockchain can be searched to identify the data records based on the matching hash value. In step 858, based on the data records, various information associated with the media item can be determined, including lineage and validation details. The details stored in the data records can be used to confirm whether the media item has or has not been validated, which training datasets include the media item, metadata associated with the media item, among other details. In step 860, the data records can be used to reconstruct an audit trail corresponding to validation of the media item, for example, by different validation nodes in a decentralized P2P computer network.

Figure 9:
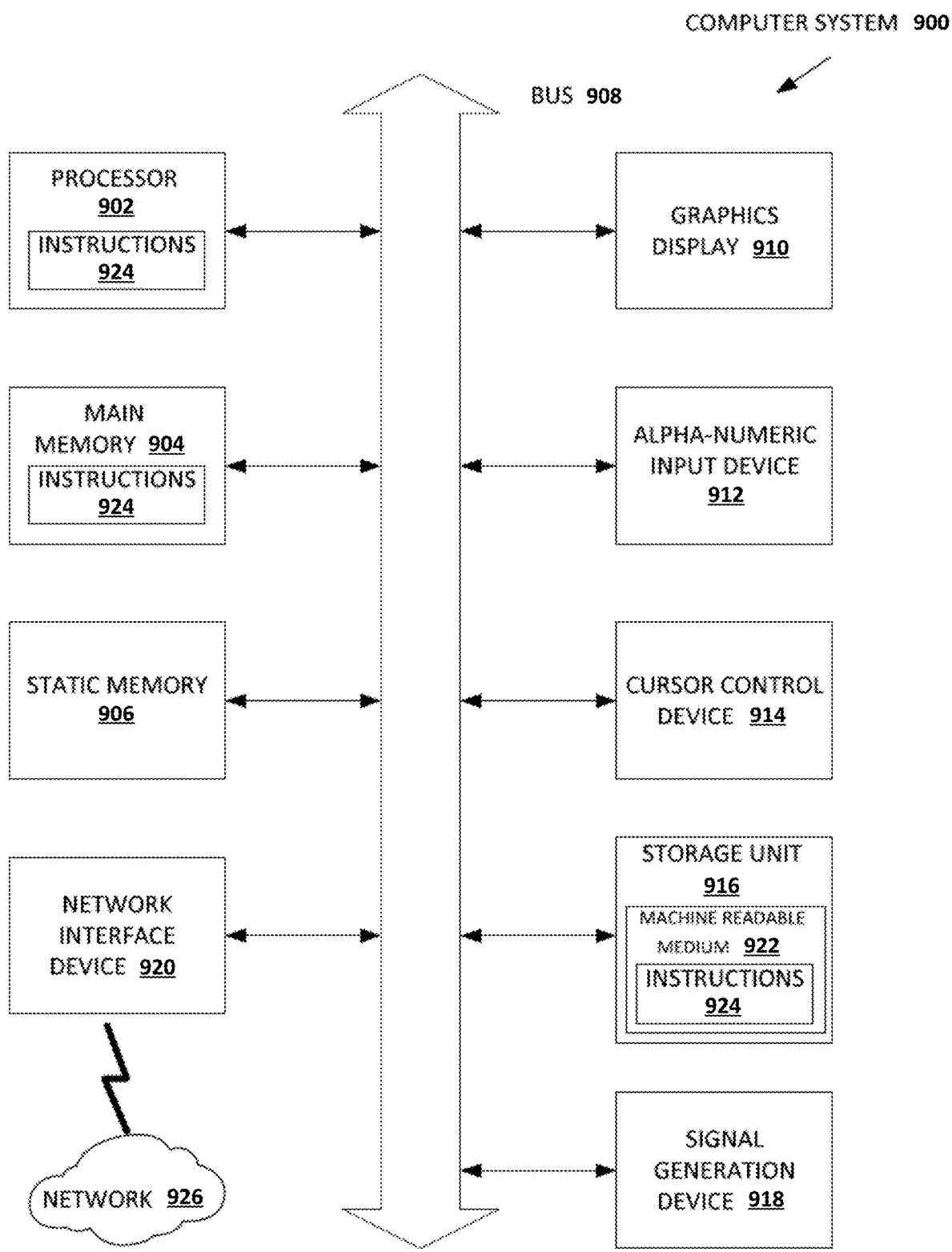
FIG. 9 is a block diagram illustrating a computing device in one example.

FIG. 9 is a block diagram illustrating a digital device in one example. The digital device may read instructions from a machine-readable medium and execute those instructions by a processor to perform the machine processing tasks discussed herein, such as the engine operations discussed above. Specifically, FIG. 9 shows a diagrammatic representation of a machine in the example form of a computer system 900 within which instructions 924 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes a processor 902 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The computer system 900 may also include alphanumeric input device 912 (e.g., a keyboard), a cursor control device 914 (e.g., a mouse, a trackball, a joystick, a motion sensor, or other pointing instrument), a data store 916, a signal generation device 918 (e.g., a speaker), and a network interface device 920, which also is configured to communicate via the bus 908.

The data store 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via network interface 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 9. Alternatively, hardware or software engines may be stored elsewhere within a computing system.

As referenced herein, a computer or computing system includes hardware elements used for the operations described here regardless of specific reference in FIG. 9 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
    at least one validation node included in a decentralized peer-to-peer (P2P) computer network comprising at least one processor and memory storing instructions that cause the at least one validation node to perform:
        obtaining a media item to be included in a dataset for training an artificial intelligence (AI) model;
        applying pre-defined validation criteria to the media item, wherein the pre-defined validation criteria comprises one or more operations for modifying or evaluating the media item to establish validity;
        generating at least one data record associated with the media item based at least in part on application of the pre-defined validation criteria, wherein the at least one data record indicates whether the media item is determined to be valid or invalid based on the application of the pre-defined validation criteria; and
        recording the at least one data record associated with the media item in a blockchain associated with the decentralized P2P computer network; and
    at least one recordation node included in the decentralized P2P computer network comprising at least one processor and memory storing instructions that cause the at least one recordation node to perform:
        determining a consensus on a validity of the media item based at least in part on a plurality of data records associated with the media item in the blockchain, the plurality of data records including the at least one data record generated by the at least one validation node; and
        recording, to the blockchain, an aggregate data record that includes information indicating the consensus determined for the validity of the media item, wherein the information provides at least an indication as to whether the media item satisfies the pre-defined validation criteria and is to be included in the dataset for training the AI model.

2. The system of claim 1, wherein said applying pre-defined validation criteria to the media item further causes the at least one validation node to perform:
    applying pre-defined digital image processing operations on the media item; and
    applying pre-defined operations for testing adversarial vulnerabilities in the media item.

3. The system of claim 2, wherein said applying pre-defined operations for testing adversarial vulnerabilities in the media item further causes the at least one validation node to perform:
    processing the media item based at least in part on one or more artificial intelligence (AI) models that are trained to evaluate the media item for adversarial vulnerabilities.

4. The system of claim 2, wherein the instructions further cause the at least one validation node to perform:
    detecting at least one adversarial vulnerability in the media item based at least in part on the pre-defined operations for testing adversarial vulnerabilities; and
    applying one or more operations to correct the at least one adversarial vulnerability detected in the media item.

5. The system of claim 1, wherein said generating at least one data record associated with the media item based at least in part on the application of the pre-defined validation criteria further causes the at least one validation node to perform:
    determining information describing a lineage associated with the media item, wherein the lineage identifies at least one training dataset in which the media item is included; and
    storing the information describing the lineage associated with the media item in the at least one data record.

6. The system of claim 1, wherein said generating at least one data record associated with the media item based at least in part on the application of the pre-defined validation criteria further causes the at least one validation node to perform:
- determining metadata information associated with the media item, wherein the metadata information includes at least one of image metadata associated with the media item, descriptive metadata associated with the media item, or administrative metadata associated with the media item; and
- storing the metadata information associated with the media item in the at least one data record.

7. The system of claim 1, wherein said generating at least one data record associated with the media item based at least in part on the application of the pre-defined validation criteria further causes the at least one validation node to perform:
- determining a hash value for the media item based on a digital cryptographic hash function; and
- storing the hash value for the media item in the at least one data record.

8. The system of claim 1, wherein said generating at least one data record associated with the media item based at least in part on the application of the pre-defined validation criteria further causes the at least one validation node to perform:
- determining one or more annotations associated with the media item; and
- storing the one or more annotations associated with the media item in the at least one data record.

9. The system of claim 1, wherein said determining a consensus on a validity of the media item based at least in part on a plurality of data records associated with the media item in the blockchain further causes the at least one recordation node to perform:
- evaluating each of the plurality of data records to determine a respective validity determination associated with each data record; and
- determining the consensus on the validity of the media item based at least in part on a plurality of validity determinations determined for the plurality of data records.

10. The system of claim 1, said applying pre-defined operations for testing adversarial vulnerabilities in the media item further causes the at least one validation node to perform:
- reorienting or resizing the media item before the pre-defined validation criteria are applied to the media item.

11. A system comprising:
at least one validation node that is included in a decentralized peer-to-peer (P2P) computer network and that comprises at least one processor and memory storing instructions that cause the at least one validation node to:
- obtain a media item to be included in a dataset for training an artificial intelligence (AI) model;
- determine whether the media item is valid by applying, to the media item, a pre-defined validation criterion that is representative of an operation for modifying or evaluating the media item;
- generate a data record for the media item that indicates whether the media item is determined to be valid or invalid based on an outcome of the operation; and
- record the data record generated for the media item in a blockchain that is associated with the decentralized P2P computer network; and at least one recordation node that is included in the decentralized P2P computer network and that comprises at least one processor and memory storing instructions that cause the at least one recordation node to:
- determine a consensus on a validity of the media item based on an analysis of a plurality of data records generated for the media item and recorded to the blockchain by a plurality of validation nodes, including the at least one validation node; and
- record, to the blockchain, a second data record that includes information describing the consensus on the validity of the media item, so as to indicate whether the media item satisfies the pre-defined validation criterion and is to be included in the dataset for training the AI model.

12. The system of claim 11, wherein the instructions further cause the at least one validation node to:
- determine information for the media item that is to be included in the data record.

13. The system of claim 12, wherein the information includes a hash value of the media item, details related to a provenance or a lineage of the media item, metadata that is associated with the media item, or any combination thereof.

14. The system of claim 11, wherein the instructions further cause the at least one validation node to:
- generate, for the media item, a hash value using a digital cryptographic hash function; and
- store the hash value generated for the media item in the data record.

* * * * *